Oct. 8, 1946.  E. M. SORENSEN  2,408,819
RADIO REMOTE CONTROL SYSTEM
Filed May 16, 1940  8 Sheets-Sheet 5

INVENTOR
EDWARD M. SORENSEN
BY
ATTORNEYS

Oct. 8, 1946.　　　　E. M. SORENSEN　　　　2,408,819
RADIO REMOTE CONTROL SYSTEM
Filed May 16, 1940　　　　8 Sheets-Sheet 7

INVENTOR
EDWARD M. SORENSEN
BY Edgar H. Snodgrass
Charles A. Rowe
ATTORNEYS

Oct. 8, 1946.　　　　E. M. SORENSEN　　　　2,408,819
RADIO REMOTE CONTROL SYSTEM
Filed May 16, 1940　　　　8 Sheets-Sheet 8

INVENTOR
EDWARD M. SORENSEN
BY
ATTORNEYS

Patented Oct. 8, 1946

2,408,819

UNITED STATES PATENT OFFICE 2,408,819

RADIO REMOTE CONTROL SYSTEM

Edward M. Sorensen, Dayton, Ohio

Application May 16, 1940, Serial No. 335,517

10 Claims. (Cl. 250—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to remote control systems and provides means for the control of a device or system located remotely from the source of control transmission, and is particularly described herein with reference to a construction for the control of a rotatable device, such as is adapted to be used in the controls of an airplane.

Remote control systems and apparatus are well known, but the devices heretofore used for this purpose have been subject to certain definite limitations. One class of remote control equipment, such as is commonly used in telemetering circuits, is satisfactory for the purpose intended and is capable of reproducing a continuously variable indication as made by a meter pointer, for example. However, this class of equipment is not useful for performing work, inasmuch as means have not been provided for operating a power means in accordance with the signals reproduced. Another class of remote control equipment which has generally been used for operating power means at a remote point to correspond with the stimulus or stimuli applied at the control point comprises those systems commonly known as step-by-step or stop-and-go systems, in which a plurality of predetermined settings are made and then by the signalling of impulses corresponding to one of the predetermined settings, the controlled apparatus is made to respond to the position signalled. This system constitutes the principle of the automatic dial telephone. However, it is subject to several defects. One of these is that positions intermediate the pre-set positions can not be obtained. This is particularly objectionable where a continuous control of the controlled device is desired with very small increments of motion being applied to the controls, as would be required for operation of a remotely controlled airplane. Another defect is that if a large number of pre-set positions are attempted to be provided in order to reduce to a minimum the limitations of the previous defect, then the apparatus used becomes increasingly complicated, resulting in expensive equipment, the greater probability of failure due to the failure of any one of the larger number of elements used, and the increase in weight of the equipment. It will be obvious that for aircraft use, the weight of the equipment should be kept to a minimum. Still another class of remote control equipment depends for its operation upon the principle of the autosyn motor, but this type of equipment has the limitation that it can not be used as a torque amplifier or, in other words, that no more power can be obtained from the controlled device than what is applied to the control.

It is therefore an object of the invention to provide a remote control which will give continuously variable operation of the controlled device, and will be capable of energizing or utilizing any amount of power at the controlled device, regardless of the energy applied to the control.

One of the difficulties in connection with the control of a mechanical apparatus having a considerable amount of inertia is the tendency for the mechanical apparatus to continue to operate due to its inertia after the electrical control system has signalled the stopping point. This results in over-shooting or over-riding of the controlled device past the desired point of operation, resulting in hunting. It is an object of the invention to overcome or reduce this difficulty as much as practicable, and means have therefore been provided for regulating the application of energy to the power means in inverse ratio to the distance the power means is from the desired stopping point.

Another object of the invention is the provision of a remote control system suitable for the operation of an airplane without the aid of a human pilot in the craft.

Another object of the invention is the provision of means, with a remote control system, of causing the controlled device to automatically go to a pre-set position upon failure of the main control system. Such a provision is particularly useful in a remotely-controlled aircraft, where the pre-set position can be such as to cause the aircraft to level off into a normal attitude of flight, or to turn the control of the aircraft over to some other system.

Other objects of the invention have to do with particular features and modifications of the remote control system, and will be more fully described hereinafter in connection with the drawings.

The complete system comprises a variable frequency generating device whose variation is continuous throughout its range. Transmission of said variable frequencies may be accomplished by any means known to the art, and as contemplated for purposes of the present invention, by the use of wire or radio transmission.

Reception is accomplished by the use of means common to the art, such as receivers and/or appropriate amplifiers, the output of which is connected to a frequency measuring unit which converts variable frequencies into voltages with a magnitude proportional to the frequency converted and independent of the amplitude changes of the frequencies above a threshold value. The output of said frequency measuring unit is coupled to a circuit having characteristics such that it is balanced by a steady voltage output of said frequency measuring unit, but is adapted to be unbalanced by any change in the voltage output, to an extent in proportion to said change. Thus, a change in the frequency transmitted will cause a change in the output voltage of the frequency measuring unit, which change of voltage will upset the balanced voltage, necessitating mechanical movement to reestablish same. The said mechanical movement is accomplished by a circuit network responsive to changes in the balanced condition and arranged to control the energization, direction of motion, and extent of motion of a power means geared to a mechanical element for rebalancing the voltage of the circuit connected to the output of the frequency measuring unit.

The arrangement is such that a frequency F creates a definite voltage E with a given angular setting of mechanical motion represented by the angle delta ($\Delta$). Any change of frequency F will result in a new voltage value $E_1$, upsetting the previous balance and causing mechanical rotation which in turn will reestablish a new balance whose angularity of mechanical rotation will be delta sub-1 ($\Delta_1$), the direction of frequency change determining the direction of mechanical motion.

In this invention, as illustrated in the drawings, the mechanical motion is accomplished by employing the resultant change of voltage created by the change of frequency to operate a bridge or vacuum tube, to cause a motor controlled by relays, as more fully hereinafter described, to drive a mechanism such as potentiometer arms to rebalance the bridge and to compensate for the voltage change caused by the frequency change.

It is thus seen that a change in the frequency transmitted is converted in accordance with the invention to a mechanical motion proportional to the frequency change. Increase or decrease of the frequency transmitted determines the direction of mechanical motion. Thereafter, the mechanical motion can be utilized for any desired purpose by means of a power take off, and in the specific application shown, is adapted to be connected to aircraft controls by instrumentalities such as a pulley and cables or other suitable means.

The invention will now be described in detail with reference to the drawings forming part of the application, in which.

In the drawings, the same reference numerals are used throughout the several views to indicate certain corresponding elements, but a letter suffix is added for each different view.

Figure 1:
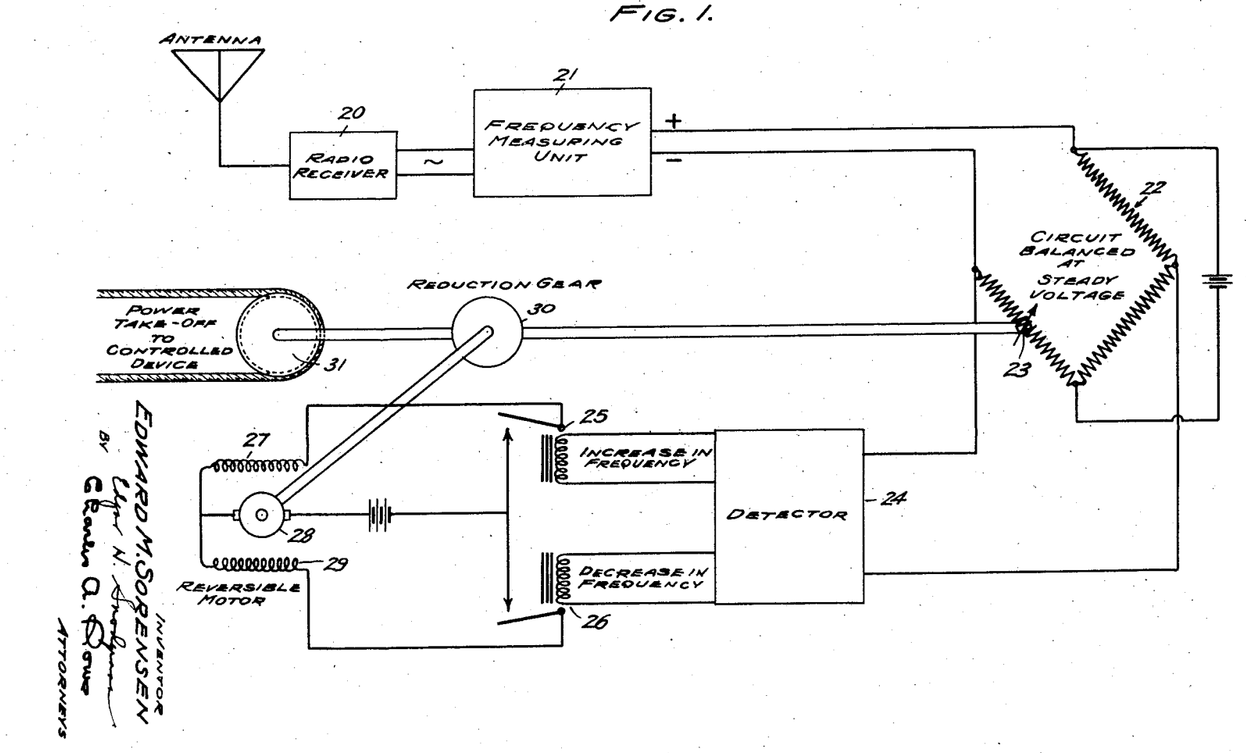
Figure 1 is a schematic drawing showing the basic elements of the invention.

*Figure 1*

Referring to the drawings, Figure 1 schematically shows the arrangement of the units of the controlled device as adapted for operation by radio signals. The output of the receiver 20 is connected to the frequency measuring unit 21, with or without amplification. The frequency measuring unit is shown with a direct current voltage output coupled to a bridge 22 having a potentiometer 23 as one arm thereof. Across the diagonals of the bridge is connected a detector unit 24 for detecting the extent to which the bridge is unbalanced, by changes in the output of the frequency measuring unit. The detector is of a type that is sensitive to the direction of current flow across the diagonal of the bridge and adapted to energize the relay 25 in response to one direction of current flow resulting from an increase in frequency of the received signal, and relay 26 in response to current flow in the other direction resulting from a decrease in frequency of the received signal. Relay 25 is adapted to in turn energize winding 27 of a power means in the form of a reversible motor 28, as illustrated causing the motor to operate in one direction; and relay 26 is adapted to energize the other winding 29 of the motor, causing the motor to rotate in the opposite direction. The motor is connected to a reduction gear 30 which has a power take-off device, such as the pulley 31 illustrated, and is also mechanically connected to the arm of the potentiometer 23 in such a manner as to rotate the potentiometer in the direction necessary to reestablish the balance of the bridge.

In accordance with the principles of operation heretofore described, it will be understood that for each given frequency, the frequency measuring unit will have a given value of voltage output. It will further be seen that the bridge 22 is adapted to be balanced by a steady voltage output of the frequency measuring unit, and to be unbalanced in one direction or the other in response to an increase or decrease in the voltage output of the frequency measuring unit; that the motor is quiescent when the bridge is balanced; but that by means of the detector and relays the unbalanced condition is utilized to energize the motor to rebalance the bridge and that in rebalancing the bridge, the motion of the motor is utilized to provide the power for the desired remote control to be accomplished.

Figure 2

Figure 2:
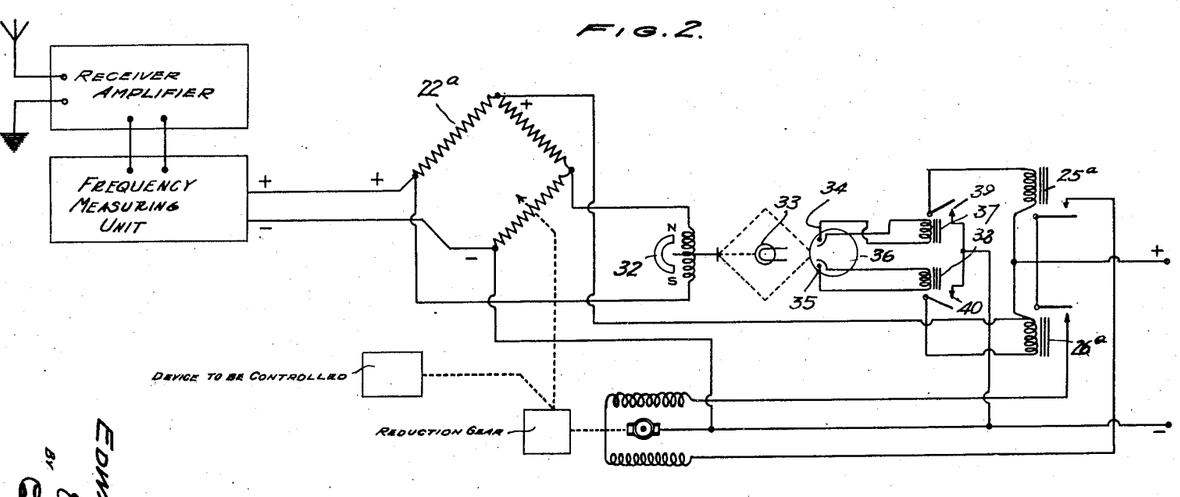
Figure 2 is a diagrammatic drawing of a basic circuit in which a mirror galvanometer and photoelectric cell is used as the detector.

The circuit shown in Figure 2 closely corresponds to the schematic arrangement of Figure 1, but shows more fully an electro-mechanical detector in the form of a mirror galvanometer, light source, and photoelectric cell arrangement.

The Wheatstone bridge 22a is adapted to be balanced at a predetermined voltage when a steady voltage output of the frequency measuring unit is applied thereto. If a change of frequency takes place, there is caused a change of voltage output in the frequency measuring unit which unbalances the bridge circuit, setting up a current in the diagonal circuit of the bridge which includes the mirror galvanometer 32 so as to cause the mirror galvanometer to shift its position in one direction in response to an increase in frequency, or to shift its position in the opposite direction in response to a decrease in frequency. A light source 33 impinges upon the mirror and the reflection of the light from the mirror is arranged to actuate one or the other of the elements 34 and 35 of the photoelectric cell 36, depending upon the position of the mirror. The photoelectric cell element so energized causes a current to flow in the corresponding relay 37 or 38 which closes the corresponding contacts 39 or 40. If relay 39 is energized, then the circuit is closed to relay 25a, which is provided with a heavy enough armature to carry the current for the motor. Likewise, if relay 38 is energized, the circuit is closed to actuate the heavy duty relay 26a for closing the circuit to the other winding of the motor.

Figure 2A:
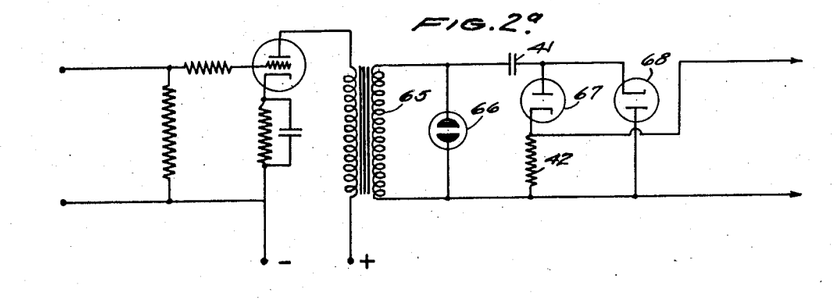
Figure 2a is a particular circuit for the frequency measuring unit.

The invention is not limited to any particular frequency measuring unit. One type is shown in Figure 2a, merely by way of example. There is used in conjunction with the frequency measuring unit, a rectifier so as to provide a direct current output.

The frequency measuring circuit shown in Figure 2a, as well as the other frequency measuring circuits shown in following modifications, provide a voltage output which is proportional to frequency and not affected by amplitude above a threshold value. Their operation depends upon converting the applied alternating voltage to a substantially square top wave and by the use of a capacity 41 and resistor 42 as a frequency timing network. A neon lamp 66, is connected across the secondary of the transformer 65. When the input voltage builds up to the flash E. M. F. of the neon lamp, it becomes conducting and limits the voltage rise. This produces a square wave across the secondary of transformer 65 in the manner well known by those skilled in the art. When the lower end of the secondary transformer 65 is negative, current flows through resistor 42, tube 67 and condenser 41, charging the latter. The extent of the charge upon condenser 41 depends upon the time available for charging and, hence, upon the frequency. If the frequency is high, then condenser will never become fully charged but will be alternately charged (through tube 67) and discharged (through tube 68) and will always remain on the lower part of its exponential charging curve. This will mean that the charging current will be high, hence, the drop across resistor 42 will be high. If the frequency is low, the condenser will be charged well up on its exponential charging curve and the overall average charging current will be less than when high frequency is used. Thus, the voltage output varies directly with frequency. The frequency range that can be measured will be limited by the value of capacity used, thereby necessitating different values of capacities for different upper frequency limits. This limitation is determined by the length of time it takes the condenser 41 to acquire its charge through a given value of resistance 42, this time constant being a fixed value dependent upon the value of the capacity and the resistor. Thus, it can be readily seen that the length of time the alternating voltage is positive or negative is solely dependent upon its frequency, thereby automatically controlling the size of capacity that would be used in this circuit for a given maximum frequency. It will therefore be obvious that the capacitance of the condenser 41 should be in inverse relation to the maximum value of the range of frequency which is to be employed. Likewise, it will be seen that it is desirable to limit the range of frequency to as small an amount as is feasible in connection with the sensitivity that is desired for the controlled device. In this connection, it may be pointed out that quite satisfactory sensitivity of a control for aircraft use can be obtained by a frequency ratio of 1 to 1.8; that is, for a frequency range of 100 to 180 cycles, sensitivity of the rotatable member which is designed to be connected to the aircraft control member can be held within the reasonable accuracy required for this operation.

Figure 3

Figures 3, 3A, 3B:
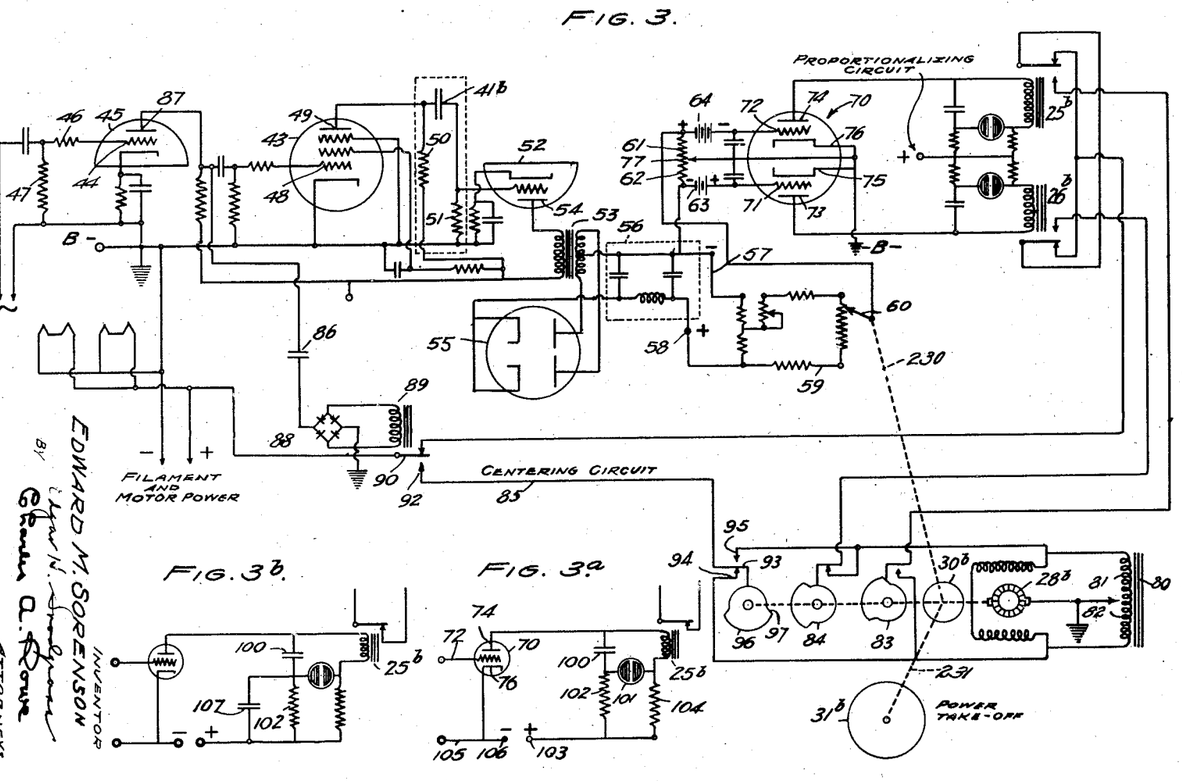
Figure 3 shows an arrangement of the basic circuit with a proportionalizing control circuit and centering circuit included.
Figure 3a shows the proportionalizing circuit separately.
Figure 3b shows a variation of the proportionalizing circuit.

The invention shown in Figure 3 is similar to the basic circuit shown in Figure 2, but adds a centering circuit for the motor and a proportionalizing circuit for controlling the action of the relays 25b and 26b. This circuit also employs modifications in the frequency measuring unit, the balancing circuit connected to the output of the frequency measuring unit, and the detector. The motor unit is also shown in greater detail.

Referring to the drawings, it will be seen that the frequency measuring unit comprises a pentode tube 43 having the characteristics of very sharp cut-off and high amplification factor. The plate current of this tube flattens off or saturates at a definite value of grid excitation. The operation of this form of frequency measuring unit is as follows: The incoming signal is fed to the grid 44 of an amplifying tube 45, being, as illustrated, one-half of a twin triode tube. The two resistors 46 and 47 prevent the grid 44 from going excessively positive. The output of tube 45 is applied to grid 48 of tube 43 and drives the plate current of said tube to a saturated value on the positive peaks, thereby generating a substantially flat top wave in its plate circuit 49.

Condenser 41b and resistors 50 and 51 constitute a frequency timing network and function similarly to the corresponding elements in Figure 2a, so far as the matter of acquiring a charge of condenser 41b is concerned. The voltage discharged from condenser 41b is applied to the grid of amplifying tube 52 which, as illustrated, constitutes the other half of the twin triode tube, of which tube 45 is a part. The voltage impulses present in the primary of transformer 53 connected to the plate 54 are isolated above ground and are rectified by twin diode tube 55 and filtered by the pi network filter 56 to provide a direct current output negative at terminal 57 and positive at terminal 58. A portion of this direct current voltage is placed across a potentiometer 59. The remainder of this voltage is distributed over the circuit comprising the arm 60 of the potentiometer, resistors 61 and 62 and back to the negative side 57 of the filter. The negative side of the filter is also connected to the negative pole of a battery 63 and the potentiometer arm 60 is also connected to the positive pole of a battery 64. The potentiometer, the potentiometer arm circuit, and the batteries 63 and 64 constitute in this modification of the control, the balancing circuit which is adapted to be balanced by a steady output voltage of the frequency measuring unit and to be unbalanced by a change in voltage output of the frequency measuring unit. The arm 60 of the potentiometer is mechanically connected by means of a suitable mechanical connection 230 to the reduction gear 30b so as to be adjusted to rebalance the circuit in response to operation of the motor 28b. Also reduction gear 30b is suitably connected by means of a mechanical drive member 231 to the power take-off 31b.

The detector in this modification is a twin triode tube 70 having two grids 71 and 72 independent of each other, two plates 73 and 74, and two cathodes 75 and 76. The grid 71 of this tube is connected in series with battery 63 at its positive pole. The other grid 72 is connected in series with the second battery 64 to its negative pole. The voltages of the batteries are dependent upon the available output voltage of the frequency measuring unit and the sensitivity required of the controlled device. By way of illustration, the voltages of the batteries as used in one model of the control and as considered in the operation hereinafter described is 4½ volts for battery 63 and 10½ volts for battery 64. The plates 73 and 74 are connected to relays 26b and 25b respectively, which control the direction of rotation and the energizations of the motor 28b.

In explaining the operation of the above-mentioned circuit, the following assumptions and conditions will be set forth: Assume, for example, that with a voltage of 25 volts across the output of the rectifier tube 55 and filter 56, that the potentiometer 59 has its arm 60 set to give a voltage of 15 volts measured from the arm to the negative side 15 of the rectifier output. Assume further that tube 70 has a plate current of equal value in each plate of the order of 1 milliamp. Assume further that the relays 25b and 26b located in each of the plate circuits of tube 70 will remain closed with a current of 2 milliamps. Assume that the grid potential for the plate current given will be −3 volts. This condition will exist as long as the voltage of 25 volts exists across the output 57 and 58 of the rectifier and filter unit 56, and as long as the potentiometer arm 60 remains in its position so as to provide a potential of 15 volts between its arm 60 and the negative side 57 of the rectifier output. Now, if a signal of lower frequency is applied to the grid 44 of tube 45, a lower voltage will exist across the output 57 and 58 of the filter 56. This will produce a lower voltage than 15 volts as measured from the arm 60 of the potentiometer to the negative side 57 of the rectified output. When this lower voltage exists, it causes a less negative potential to exist on the grid 71 of tube 70, thus causing an increase of plate current in the plate 73 of said tube. It will be noted that under normal conditions with the grid potentials at −3 volts, relays 25b and 26b are open. When relay 26b is closed, a current flows in the field of motor 28b. The motor is connected so that this will cause same to rotate in the direction to secure a potential which will satisfy the grid voltage for a potential of −3 volts on each grid, and vice versa for relay 25b, relay 25b being controlled by an increase of potential on grid 72. The normal grid potential is created by bias cells 63 and 64 in series with each grid. The static potential of these cells is different in the fact that one potential going to grid 71 has its plus side connected to the grid, and its negative side connected to the grid return. Bias cell 64 has its negative side connected to grid 72, with its positive side connected to the grid return and to the potentiometer circuit. Connecting across resistors 61 and 62 is a definite voltage which in this case is 15 volts. This causes a potential of −3 volts to exist on grid 71 to grid return point 77, and on grid 72 to grid return point 77. In the event a voltage change from 15 volts occurs across resistors 61 and 62, it will cause a lesser negative voltage to be present on either grid 71 or 72, depending on which way the potential changes; i. e., if the voltage is less than 15 volts, grid 71 will have a less negative potential applied to it, grid 72 having a more negative potential applied to it. If the potential is greater than 15 volts, grid 71 will have a more negative potential applied to it; grid 72 having a less negative potential applied to it. In the event the potential on the grid becomes less negative from the pre-set point, this will in turn cause an increase in plate current, relays 25b and 26b being so adjusted that a given increase in plate current will cause the arm to close, completing a circuit to cause rotation of the motor.

The motor unit shown in Figure 3 is similar to the motor units of Figures 1 and 2, but is shown in greater detail, as including a magnetic brake and clutch 80. When the motor is energized, one of coils 81 or 82 has a voltage across it which creates a magnetic field which is designed to engage the motor to the reduction gear 30b. When the voltage no longer exists, the magnetic field collapses in the magnetic brake and clutch, disengaging motor 28b and being further designed to brake the inertia of reduction gear 30b. In this manner, the motor is prevented from hunting and over-ride to a great extent. Limit switches operated by cams 83 and 84 are provided to limit the angular rotation of the device to maintain the operation of the motor within the angular limits of the potentiometer or other balancing element.

CENTERING CIRCUIT

In the event that there is a failure in plate supply voltage, filament supply voltage, transmission link or any interruption of the frequency which is set up on grid 44 of triode section 45, a centering circuit 85 will go into operation, causing the control or power take-off 31b to move to a pre-set position. This operation is accomplished by capacitatively coupling through condenser 86 the potential of alternating voltage present on plate 87 of tube 45 to bridge rectifier 88, the output thereof being connected to relay 89 whose arm 90 is closed to contact 91 as long as an alternating voltage of sufficient amplitude exists on grid 44. While arm 90 is making contact with contact 91, relays 25b and 26b have complete control of the power take-off 31b. In the event of a failure, arm 90 moves back to contact 92, which connects through contact 93 with contact 94 or 95, contact 94 controlling the operation of the motor in one direction, and contact 95 controlling the operation in the other direction. Contacts 94 and 95 are controlled by cam 96 mounted on the reduction gear 30b. A cam lift 97 constitutes the centering or pre-set position of the controlled device which is to be obtained in the event of failure as above specified. When the cam is rotated counter-clockwise, as shown, the lift 97 will lift the contact 93 to a point midway between contacts 94 and 95, at which time the circuit to the motor will be open, causing de-energization of same. Likewise, if the contact 93 were resting on the cam arc of greater diameter, clockwise rotation of the cam would cause the contact 93 to disengage contact 95 as it dropped down the cam lift 97, thereby causing rotation of the controlled device to the same pre-set position, at which point the motor circuit is opened.

This circuit can also be used to transfer control for the controlled device to some other control means, such as a set of gyro-controlled instruments as used in an "automatic pilot," or to any other fixed control means. It will be understood that by connecting in series with relay 89 other relays or switch means which are associated with various elements of the control circuit so as to be closed under normal operating conditions, a failure of any such elements will cause the relay associated therewith to open, with its arm making up the contact for the centering circuit, causing operation of same in the manner above described. Likewise, it will be understood that a single relay circuit, such as shown and described in Figure 3, may be associated with any particular element of the control, so that upon failure of the same, the centering circuit will go into operation.

PROPORTIONALIZING CIRCUIT

To secure greater sensitivity and provide a higher degree of accuracy in the actuation of potentiometer arm 60, it is necessary to make further provision for controlling the inertia of the motor and the controlled device, so as to prevent hunting and over-riding and to insure substantially dead-beat stopping action. This is accomplished by means of the proportionalizing circuits shown in Figure 3, associated with the plate controlled circuits of relays 25b and 26b. Each proportionalizing circuit shown functions alike in response to an increase in the plate current of plates 73 or 74, and therefore a description of the one will suffice for both.

The circuit is shown separately in Figure 3a, illustrated with a triode tube corresponding to one-half of the twin triode 70. The circuit will be seen to consist of a condenser 100 and a neon tube 101 connected in series and parallel to the relay 25b, condenser 100 being connected to the plate side of the relay. At the junction of the neon tube 101 and condenser 100 is a resistor 102, the other terminal of resistor 102 being connected as at 103 to the plate supply potential. To the junction of the neon tube 101 and the relay winding is connected a resistor 104 having its other terminal running to side 103 of the source of potential. Grid 72 of vacuum tube 70 has normally impressed thereon the negative 3 volt potential described above in connection with the function of vacuum tube 70 as the detector. The opposite side of the grid potential as at 105 runs to cathode 76, also connected to the negative side of the plate potential 106.

To illustrate the action of the above circuit, assume that there is an increase in plate current in the plate 74 in the order of 30 microamps, due to a less negative potential on grid 72, in response to an increased voltage output of the frequency measuring unit due to an increase in frequency of the received signal. This causes condenser 100 to take an increased charge through resistor 102 and at the same time a potential is set up across resistor 104 of a sufficient value to cause ignition of neon tube 101. When neon tube 101 ignites, a discharge path through relay 25b and neon tube 101 is provided for condenser 100. The current flow through relay 25b caused by the discharge of condenser 100 is in excess of the current required to close the relay, so that the same will close during the discharge of the condenser. Thus, the motor is put in operation for a brief interval of time. When condenser 100 is discharged, the neon tube extinguishes, since resistance 102 is provided with a great enough resistance to prevent the passing of current of sufficient value to maintain the neon tube ignited. Condenser 100 being discharged and neon tube 101 being extinguished, the circuit immediately starts to recharge condenser 100 through resistance 102, whereupon the cycle will be repeated. As the potential on grid 72 becomes still less negative, the plate current in plate 74 will be steadily increasing so that the rate at which the neon tube 101 and condenser 100 operate to actuate relay 25b will increase. When the plate current is of sufficient value to maintain the relay continuously closed, the proportionalizing circuit has no more effect until the grid potential is made more negative to a value slightly less than the potential at which the relay is continuously closed. Then the proportionalizing circuit will again actuate the relay intermittently at a decreasing rate until the grid potential reaches its normal value at which the potentiometer circuit is balanced, which in this case is negative 3 volts.

In this manner, energy will be supplied to the motor or other power means in a pulsating manner, with the rate of pulsations being in direct proportion to the distance the controlled device is from the point corresponding to the signal frequency. However, when the reduction gear is of a sizeable ratio, the motion of the controlled element will appear to be substantially continuous and progressive in its rate of increase or decrease.

The values of condenser 100 and resistance 102 determine the rapidity with which the proportionalizing circuit will operate for a given plate current. The value of resistor 104 determines the plate current required to cause operation of the relay in cooperation with the neon tube and condenser.

It will be seen that the proportionalizing circuit operates as a function of current, wherein as the plate current is increased across the proportionalizing circuit to an amount corresponding to the ionization potential of the neon tube, the circuit will start to function, due to the increased voltage drop across resistor 104. As the voltage continues to increase beyond the limits of the proportionalizing circiut, the proportionalizing control will stop and the device will move at its full rate, but as soon as the mechanical elements of the control approach the desired setting, the proportionalizing circuit functions at a rate equal to the amount the control is out of balance. Thus, as the control is brought into balance, the proportional rate becomes slower until and within a very close limit. The proportional time is cut down until the balance is just reached and difficulties from hunting or overshooting are avoided. In this sense, the circuit may be described as an "anticipator circuit."

In Figure 3b is shown a variation of the proportionalizing circuit in which a condenser 107 is connected in parallel with resistance 102. This arrangement has the effect of increasing the intervals of time required for the condenser 100 to receive its charge, and similarly, the time to discharge. Consequently, the circuit will operate with less rapidity and the relay 25b will be closed and open for longer intervals of time.

It will be understood that by adjusting the values of resistor 104 or the spring tension on the relay armature, the proportionalizing circuit could be designed to control the operation of the relay 25b during the maximum operating plate current so that a proportionalizing control might be maintained throughout the operation of the controlled device.

Figure 4:
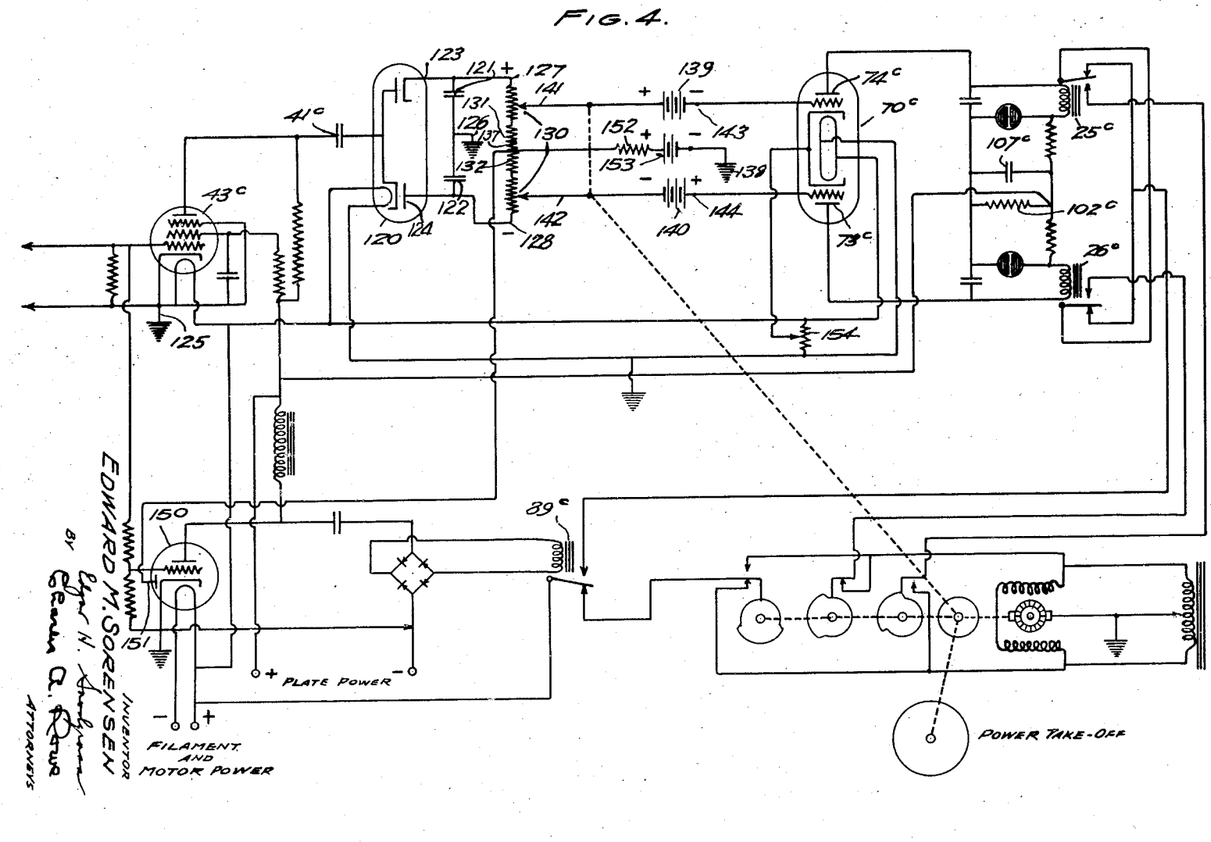
Figure 4 shows a preferred circuit arrangement which is similar to Figure 3 but incorporates certain modifications and additional features including a modified rectifier circuit in the frequency measuring circuit, an emission compensation circuit for the relay control elements, and the proportionalizing circuit shown in Figure 3b.

*Figure 4*

The circuit shown in Figure 4 is similar to that shown in Figure 3, except for the following described modifications: In the frequency measuring unit the amplifying tube 45 for the input signal of Figure 3 and the amplifying tube 52 for the flat top wave voltage pulses produced by the tube 43 have been omitted. The transformer 53 and the filter 56 of Figure 3 have been replaced in Figure 4 by a more compact rectifier circuit which comprises twin diode rectifier tube 120 coupled directly to the timing condenser 41c. Condensers 121 and 122 are connected in series arrangement across cathode terminal 123, opposite the anode terminal 124 of tube 120. These condensers serve as filter condensers to filter out any alternating voltage which might be present from cathode 123 to ground or plate 124 to ground, and also serve to provide a conducting path for the electrons during the charge of the condensers 121 and 122. Since the one leg of the alternating current applied to this rectifier circuit through condenser 41c is connected to ground 125, a return ground connection 126 is connected to the output of the rectifier circuit at the junction between the two condensers 121 and 122.

It will thus be seen that the output terminals 127 and 128 of the rectifier circuit will have substantially equal and opposite polarities with respect to the ground reference 126, and that the voltage directly across these terminals is double the voltage of the alternating current which is applied to the rectifier circuit, so that in this manner the voltage supplied by the frequency measuring unit to the potentiometer has been rectified, amplified, and isolated above ground, thus obviating the necessity of the transformer 53 and amplifying tubes of Figure 3, thereby resulting in considerable saving in weight and greater simplicity. This rectifier circuit also has the advantage of providing more linearity of response; i. e., for a frequency change of 2 to 1, there results a voltage change of 2 to 1, whereas with the circuit as shown in Figure 3, it may be difficult to obtain linearity of response due to the characteristics of triode 52 and transformer 53.

In the balancing circuit connected to the output of the rectifier at points 127 and 128 and which is adapted to be balanced at a steady voltage output of the frequency measuring unit, a dual potentiometer 130 is used. Dual potentiometers 130 and resistors 131 and 132 serve as the load resistance for the rectifier 120. The junction point 137 returns to ground 138 through the emission compensation network hereinafter described, but may be omitted as this circuit does not require the load resistance to be grounded to provide a potential. The ground is used to assure a balance of the two potentials to the ground point, and is for the purpose of the radio control circuit. Batteries 139 and 140 have the same voltage but are connected to the arms 141 and 142 of the dual potentiometer in opposite polarity arrangement so as to "buck" the voltage existing across the potentiometer arms and will provide a desired voltage across points 143 and 144 when the voltage existing across the arms is at the desired relation to the voltage of the batteries.

The advantage of a dual potentiometer in this circuit is that it provides an equal load on both sides of the rectifier circuit between arm 141 to ground and arm 142 to ground. Another reason for using dual potentiometers in this circuit is that it is difficult to obtain potentiometers of the wire wound variety having a high enough resistance in a single unit. Thus, it is advantageous to use two potentiometers, thereby getting twice the resistance and providing a satisfactory load impedance for the rectifier.

Twin triode detector tube 70c has its grids connected to the points 143 and 144 and functions in response to an unbalance of the potentiometer circuit to control the relay circuits to the motor in the same manner as the detector described in Figure 3.

It can be seen that in lieu of the detector tube 70c, a meter with a series resistance can be connected across the points 143 and 144. Then, when the potential existing across the arms 141 and 142 of the potentiometer is equal, the potential or current across points 143 and 144 as read on the meter will be zero, but when the frequency is raised or decreased, the voltage output of the rectifier would increase or decrease respectively, causing a current to flow in the meter in a direction corresponding to the direction of voltage change. To nullify this current and bring the reading to zero, it would be necessary to move the potentiometer arms in a direction to bring about nullification of the current. By calibrating the potentiometer in frequency, the frequency could be read directly on a dial. In this way, there is constructed a novel frequency meter having the advantages of being simple, economical of manufacture, and quick measurements.

The proportionalizing circuit used in Figure 4 has incorporated therein a condenser 107c in parallel with resistance 102c and functions in the same manner as the circuits described in connection with Figure 3b. Condenser 107c and resistor 102c are respectively similar to the similarly designated condenser and resistance of Figure 3b and function in the same manner although in this instance, the twin triode 70c replaces the single triode of Figure 3b.

The motor circuit is the same and functions in the same manner as that shown in Figure 3.

The centering circuit of Figure 4 functions in exactly the same manner as that shown in Figure 3, but is provided with an amplifier tube 160 for the power supplied to the relay 89c.

Compensation for emission variation due to changes in filament voltage is provided in this circuit, and is accomplished in the manner shown and next described in detail in connection with Figure 5. Tube 150 is provided with a second plate 151 arranged in diode relation to the cathode, for use with the emission compensation circuit. This circuit includes a resistance 152 and battery 153 arranged in series with the diode plate 151. The plate circuit just mentioned and connected to plate 151 is in parallel to the grids of tube 70c. Additional emission compensation is provided by connecting the cathode of tube 70c to a portion of the filament voltage by means of a variable resistor or potentiometer 154.

Figure 5:
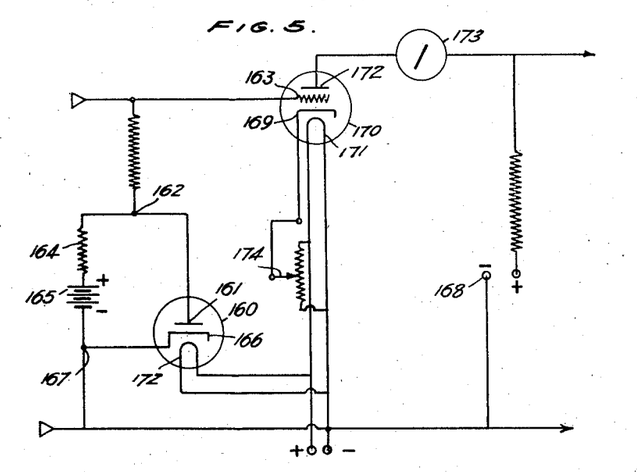
Figure 5 is a simplified schematic drawing of the emission compensation circuit employed in Figure 4.

EMISSION COMPENSATION CIRCUIT
Figure 5

Figure 5 is a simplified schematic view of the emission compensator circuit as employed in the circuit shown in Figure 4. The purpose of this circuit is to provide emission compensation to overcome plate current variations due to increase or decrease of filament voltages from a normal value. In a direct current amplifier, such as twin triode detector tube 70c represents in the control, or in any amplifier where a great amount of stability is necessary for variations in supply voltages, this circuit will be found useful. It is a known fact that when the filament temperature is increased, there are a greater number of electrons emitting from said filament. This is also true with a cathode type vacuum tube. The emission compensator depends for its operation on the use of the Edison effect. The potential changes set up from a diode plate to its cathode will vary with the temperature of the cathode. The manner in which this potential varies is controlled at the rate at which the cathode heats up or cools off, depending upon the supply potential to said cathode.

This circuit comprises a diode tube 160 having its plate 161, corresponding to plate 151 of tube 150 in Figure 4, connected to the grid return 162 of grid 163 corresponding to the grids in the twin detector tube 70c of Figure 4. The grid return is also connected by a resistor 164 through battery 165 to the cathode 166 of said diode tube. Resistor 164 and battery 165 correspond to resistor 152 and battery 153 of Figure 4. The battery and cathode are commonly connected to ground, or as shown, to B— terminal 168. With this circuit, the bias on grid 163 will vary, by measuring the bias from grid 163 to the cathode 169 of triode tube 170, in a direct relation with the voltage applied to filament 171, assuming filament 171 is supplied from the same potential which supplies the filament 172 of the diode. The manner in which this bias potential varies follows very closely to the value of potential needed to bias the grid to maintain the plate current of plate 172, as measured in meter 173, at the same value which was flowing prior to a change in filament voltage.

The negative side of the battery 165 is connected to the cathode 169. Thus it can be seen that the diode plate 161 will have a positive potential with respect to cathode 166. Any changes in current being drawn by said diode will be represented by the voltage drop across resistor 164.

In some cases it has been found necessary to include some of the filament supply voltage as a bias potential on the grid, especially in cases where the emission of the tube varies a great deal for a small filament voltage change. By placing a potentiometer 174 (corresponding to potentiometer 154 of Figure 4) in the return circuit of cathode 169, a portion of any voltage variation across said filament circuit will also be represented on the grid. The potentiometer should be adjusted to provide the desired amount of bias potential. Fixed resistances may be added to each side of the potentiometer if necessary. This added bias voltage, together with the potential as set up across said diode 160, provides the necessary control to hold the plate current of said triode at a steady value for large changes in filament voltage. These changes in filament voltage may be as great as 100%; for example, for a tube which has a normal operating voltage of 6.3 volts, the filament supply voltage may vary from 4 to 8 volts, with the emission remaining constant over this range.

It may also be pointed out that this additional voltage may be obtained from the plate supply voltage in those cases where the plate supply voltage is obtained from the same source as the filament supply voltage, as any variation in the filament voltage will cause a variation in the plate supply voltage in the same proportion.

As applied to Figure 4, these circuits serve to render the current response of the plates 73c and 74c of the twin triode tube 70c independent of filament voltage variations within the range compensated, and responsive only to the signal applied to the grids from the output of the rectifier circuit. This is very important where the filament voltage can not be maintained constant, as would probably be the case in the power supply of an aircraft. In the event of a change in filament voltage variation without provision for emission compensation in response to such change relays 25c and 26c controlling the motor circuit would be affected by changes in the plate current of plates 73c and 74c, which would not be caused by a change in the grid signal, and would therefore result in erratic operation of the motor.

Figure 6

Figure 6:
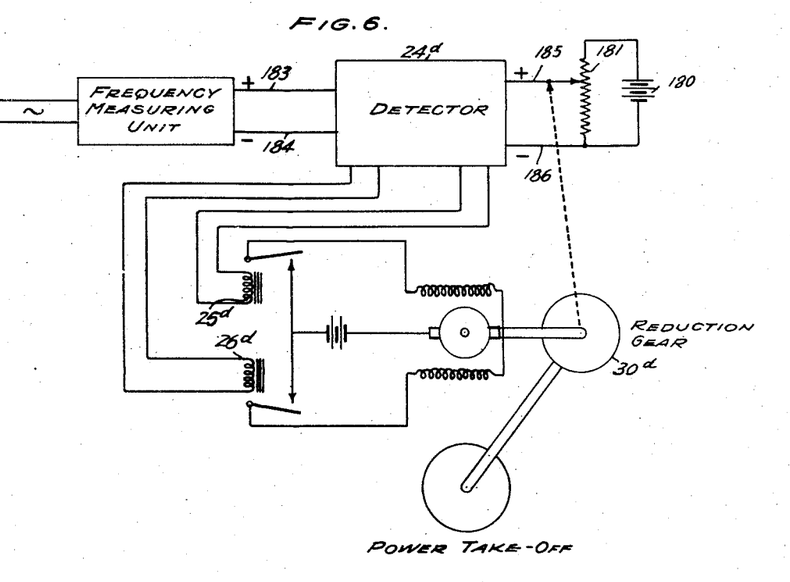
Figure 6 is a modification of the invention having a circuit adapted to be balanced at any steady voltage output of the frequency meter.

Figure 6 shows schematically the circuit of the controlled unit of a remote control system wherein a balancing circuit is used which is adapted to be balanced at any steady output voltage of the frequency measuring unit. The basic elements of this circuit are as shown in Figure 1. The balancing circuit comprises a battery 180 having a potentiometer 181 connected in parallel with the battery. The detector 24d is arranged with respect to the terminals 183 and 184 of the frequency measuring unit and with respect to the terminals 185 and 186 of the balancing circuit so as to be sensitive to a difference in potential across these two sets of terminals. Assume, for example, that a voltage of 10 volts exists across terminals 183 and 184. Then the motor will be quiescent when the voltage across terminals 185 and 186 is adjusted to be 10 volts. But until the voltage is so adjusted, or if adjusted, and a change in voltage across terminals 183 and 184 takes place, the detector will be sensitive to such deviation or change and will energize relay 25d or 26d, depending on the polarity of the difference in potential between the two sets of terminals, to cause one of the relays to energize the motor. The arm of potentiometer 181 being connected to the motor through reduction gear 30d, will be rotated to rebalance the voltage across terminals 185 and 186 to match that across 183 and 184. To illustrate this action further, assume that the frequency of the received signal increases. Then the voltage across terminals 183 and 184 will be, say, 12 volts. This will create a difference of potential between these terminals and terminals 185 and 186 so that the detector will actuate the motor to rebalance the potentiometer 181 to set up a potential of 12 volts across terminals 185 and 186, at which time, the relay will fall out and the motor will de-energize.

Figure 7:
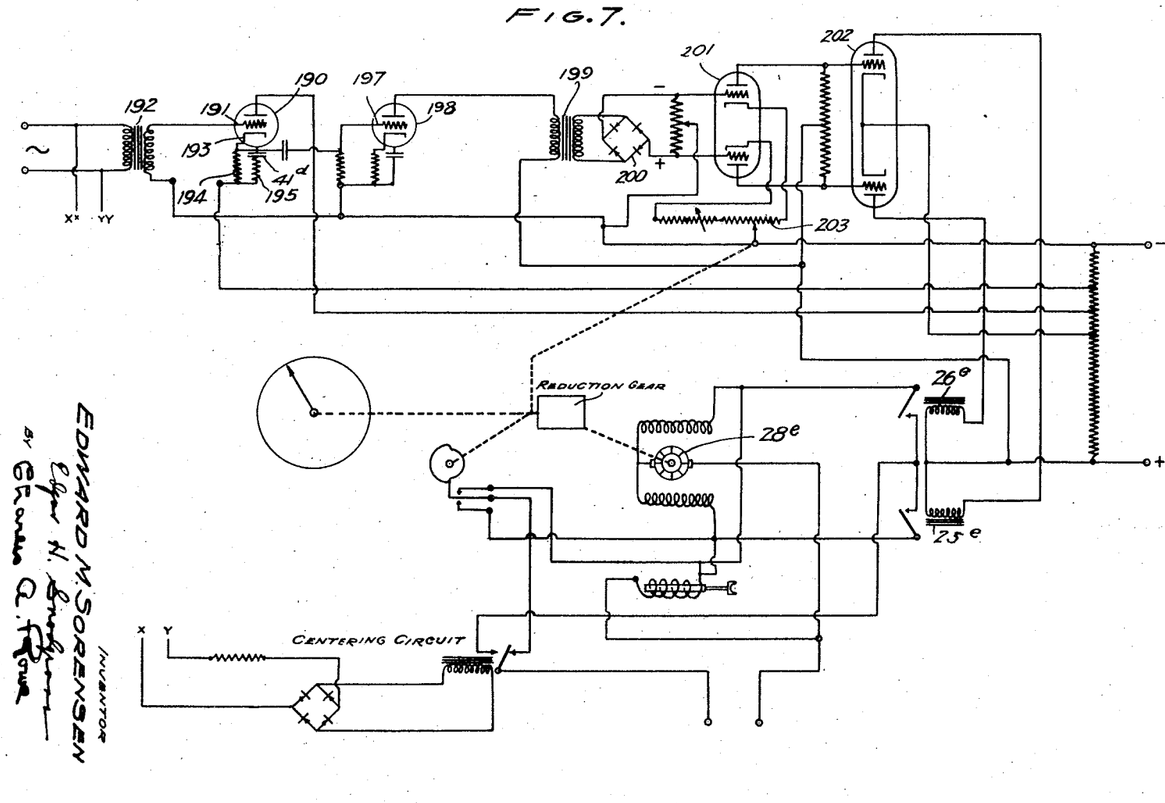
Figure 7 is a modified circuit employing a gas triode tube in the frequency measuring unit and a two-stage direct current amplifier for the detector.

*Figure 7*

In the form of invention shown in Figure 7, a gas triode is employed in the frequency measuring circuit, and bridge rectifiers are used. Figure 7 omits the proportionalizing circuit. The gas triode 190 whose grid 191 is fed with an audio signal from transformer 192 has its cathode 193 connected through a condenser-resistor network comprising resistors 194 and 195 and condenser 41d, which constitutes the frequency timing network. The frequency range of the circuit is determined by the values of the various resistors and condenser in the network. The voltage impulses of this network are coupled to grid 197 of vacuum tube 198 which serves to amplify these pulses. Said amplified pulses are present across the transformer 199 whose secondary is connected to the bridge rectifier 200. The output of said rectifier is connected to an amplifying twin triode 201 and again amplified by twin triode 202. The relays 25e and 26e operate in the same manner as described in connection with Figure 3 to control the operation of motor 28e which rebalances potentiometer 203 located in the cathode circuit of twin triode tube 201.

Figure 8:
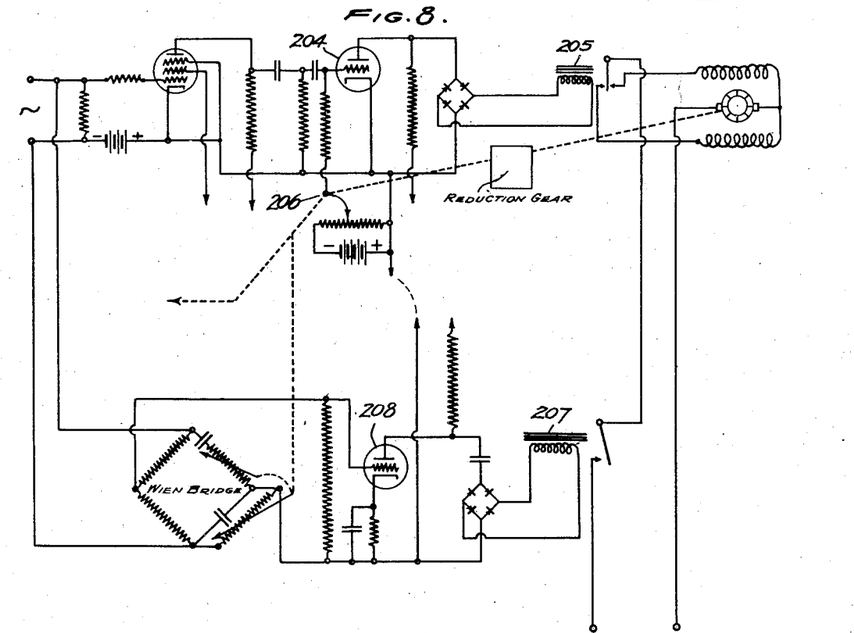
Figure 8 is a modified circuit in which a Wien type bridge is used.

*Figure 8*

The form of invention shown in Figure 8 includes a frequency measuring circuit and otherwise conforms in general to the principles of the invention, except that a bridge circuit of the Wien type is further employed as a frequency measuring element. The frequency measuring circuit provides a means of changing the audio voltage of a given frequency into a definite voltage which is independent of amplitude variation and solely dependent on frequency variation. In the tube circuit following the frequency meter the relay 205 has contacts located on the pull-in side and the drop-out side. Thus, if the relay is open, it makes up the motor circuit for right-hand rotation. If the relay is in, it makes up the circuit for left-hand rotation. The motor is mechanically connected to a gain control circuit 206 of the tube following the frequency meter which is adapted to provide a fixed grid bias potential at any steady frequency regardless of the frequency amplitude. The motor is also connected to the arms of the Wien bridge. Assuming that the Wien bridge is balanced at a given frequency and the frequency is raised, the Wien bridge becomes unbalanced and has an output across its detector arms which trips the relay 207 located in the plate circuit of the amplifier tube of the Wien bridge. This will close the power to the motor circuit. The motor then adjusts the gain control circuit to restore the grid bias to its fixed value and drives the Wien bridge in the direction of a "null." When a "null" is reached, the relay located in the plate circuit of the amplifier tube of the Wien bridge drops out causing the motor to cease operation. Thus it can be seen that the frequencies varying either high or low from a previously set point cause the motor to rotate in a desired direction to rebalance the bridge. The relay 205 controlling the direction of operation of the motor is always sensitive to a decrease or increase of the received signal because the plate current of tube 204 is adjusted to the value at which the relay trips by means of the gain control circuit 206 with each new frequency value or setting of the controlled device.

Figure 9:
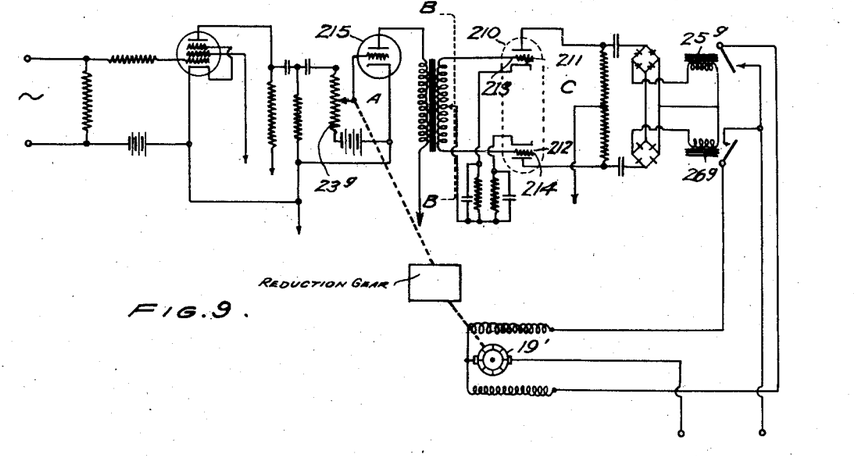
Figure 9 is another modification of the invention using relays which operate on a plate current differential.

*Figure 9*

In the form of invention shown in Figure 9, and referring to the circuit arrangement shown to the left of the dotted line B—B, part A, the output of the electronic frequency measuring device is not rectified but is left in its flat top wave pulses, and its amplitude which is being fed to the following tube is controlled by the motor which drives the radio control; thus if the frequency increases, the voltage as measured from the arm of the potentiometer to the cathode circuit increases. This causes the motor to rotate in a given direction to turn the potentiometer arm to a lower value of potential, or to the same potential that was present on the grid of the tube following the frequency meter previous to the increase in frequency.

Reference is now made to the circuit arrangement embraced in that part of Figure 9 located to the right of dotted line B—B, generally denoted as part C. This part of the circuit changes the audio signal voltage into angular or lineal mechanical motion proportional to frequency. The operation is outlined as follows: Twin tube 210 includes two triode sections 211 and 212. Section 211 is so biased that it takes a lesser signal on grid 213 to operate to pull in the relay 25g in the plate circuit of said section 211, and it takes a greater signal on grid 214 of section 212 to operate relay 26g located in the plate circuit of said section 212.

The functioning of the circuit is elaborated more fully as follows: Signal voltage e is present on the grid of tube 215. This signal voltage is sufficient to cause relay 25g to be closed, which leaves the contacts open. Voltage e applied to the grid of tube 215 is not sufficient to cause relay 26g in the plate circuit of section 212 to close. It is therefore seen that the circuit including the potentiometer 23g, twin triode tube 210, and the relays, is balanced at voltage e and the motor is quiescent. If the signal becomes greater, relay 26g will close causing operation of the motor 28g in one direction, as the contacts of this relay 26g are closed when the relay closes. The motor will continue to operate until it has adjusted the potentiometer, to which it is mechanically connected, to a lower value of potential to reestablish the signal voltage e on grid of tube 215 at which point relay 26g drops out and the motor becomes quiescent. If the signal becomes less on the grid of tube 215, the relay 25g in the plate circuit of section 211 drops out, closing the contact and operating the motor 28g in an opposite direction and adjusting the potentiometer to provide a higher value of potential to reestablish the signal voltage e. Thus it can be seen that the relay 25g and 26g are arranged and controlled so as to cause the motor to be quiescent when a steady frequency is received, to be operated in one direction in response to an increase in the frequency of the signal received, and to be operated in the other direction in response to a decrease in the frequency of the signal received.

It will be understood that the same operation can be obtained by biasing grids 213 and 214 equally but adjusting relays 25g and 26g so that they close at different values, relay 25g being closed at the normal grid signal bias potential and adapted to open in response to a decrease in such signal bias, and grid 26g being open at the normal signal bias and adapted to close in response to an increase in such bias.

Figure 10:
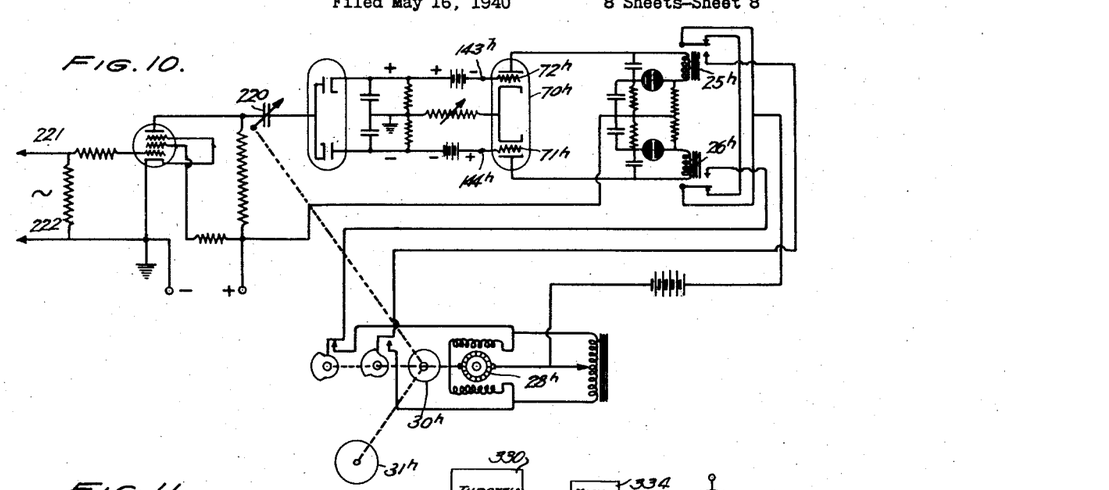
Figure 10 is a modification of the invention wherein a variable condenser is used as the balancing element.

*Figure 10*

Figure 10 depicts a circuit having basically the same elements as the circuit shown in Figure 4. This circuit differs from that shown in Figure 4 inasmuch as a voltage balancing device, such as the potentiometer, has been replaced by a variable capacity 220, said variable capacity being attached to the reduction gear 30h attached to motor 28h. The motor is controlled by relays 25h and 26h through twin triode 70h which is controlled by the amount of voltage which exists between points 143h and 144h, this part of the circuit being identical to that shown in Figure 4. The proportionalizing circuit shown in Figure 3b is also associated with each relay. The value of voltage appearing between points 143h and 144h is in accordance with the frequency of the signal voltage applied between points 221 and 222. Control of said voltage is accomplished by varying the value of condenser 220. Assuming the grids 72h and 71h of twin triode 70h are balanced at a negative 1 volt potential, then that condition makes relays 25h and 26h idle. For said negative 1 volt bias condition, assume that the potential between points 143h and 144h is 20 volts for some frequency being impressed at points 221 and 222. In the event there is a change in frequency between points 221 and 222, this will at once change the voltage between points 143h and 144h. This also unbalances the voltage set up on grids 72h and 71h, thereby making one grid more negative and one grid less negative. This causes the motor 28h to operate in a predetermined direction, thereby causing condenser 220 mechanically connected to the motor to rotate in the direction necessary to acquire a value to reestablish the potential of twenty volts existing between points 143h and 144h, at which time the voltage on grids 72h and 71h returns to its normal value of negative one volt, causing the relay to open and the motor to stop.

The circuit of Figure 10 is otherwise similar to that of Figure 4 except that the centering circuit and emission compensation circuit are not shown.

As was shown in connection with Figure 4, this circuit lends itself for use as a novel frequency meter. By disconnecting that part of the circuit prior to points 143h and 144h from the grids of twin triode tube 70h and attaching a meter in series with a resistance across said points, current flow or voltage across these terminals can be detected. Then, by calibrating the variable condenser in frequency, and adjusting same until the reading of the meter is a predetermined value, the frequency of the input signal across points 221 and 222 can be read upon a dial. This circuit when used as a frequency meter has as its advantages a high degree of accuracy and an exceedingly wide range of measurement as well as the advantages pointed out in connection with the meter of Figure 4.

MULTI-CONTROL SYSTEM FOR AIRCRAFT

Figure 11:
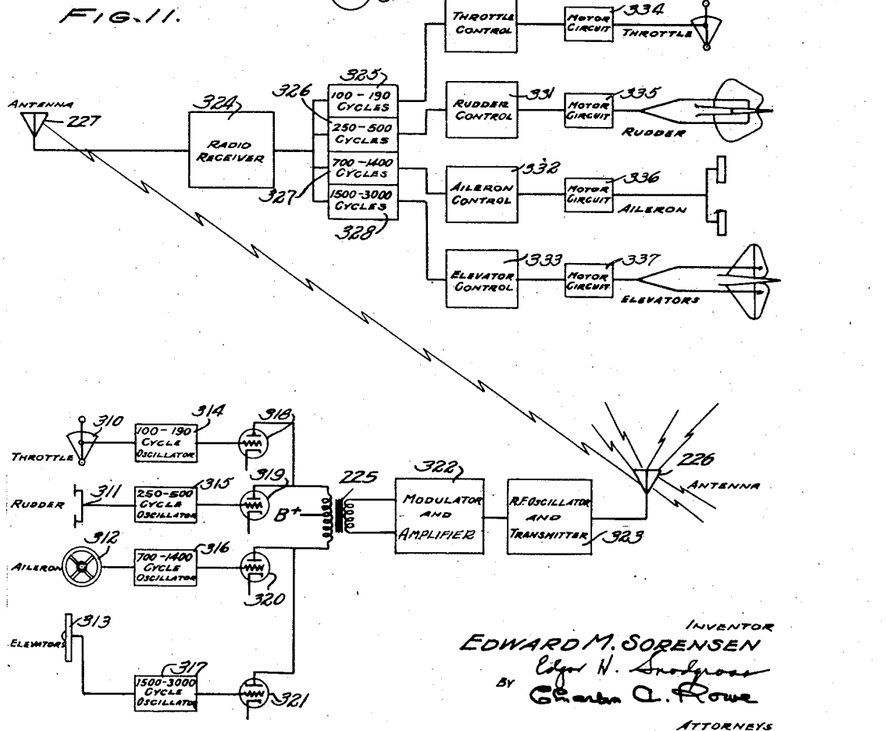
Figure 11 schematically illustrates a remote control system for an aircraft, wherein signals for a plurality of controls are transmitted by a single radio carrier.

*Figure 11*

Figure 11 shows schematically the apparatus and method of operation of same for a remotely controlled aircraft, in which control is provided for the throttles, rudders, ailerons, and elevators. The controlling station (which may be a ground station or another aircraft) has four control elements 310, 311, 312 and 313 representing and corresponding to the throttle, rudder, ailerons, and elevators. These control elements are mechanically connected to four oscillators 314-317 respectively having frequency ranges, as illustrated of 100 to 190, 250 to 500, 700 to 1400, and 1500 to 3000 cycles respectively. The output of these oscillators is fed to the grids of amplifying tubes 318-321 and the output of the tubes is then mixed in the transformer 225, the output of the transformer being fed to a modulator and amplifier 322 of any well known suitable design. The output of the amplifier is connected to modulate a radio frequency transmitter 323 and is transmitted by means of antennae 226. The transmission is exactly that of radio communication and therefore it is obvious that the signal can be transmitted to any distance, being limited only by the power of the transmitting station, and the characteristics of the transmitter. The signal is received at the antennae 227 of the controlled aircraft and is applied to a radio receiver 324 of any well known commercial design having good operating qualities. The output signal of the radio receiver is then fed to four band pass filters 325-328, each filter being selected to pass frequencies corresponding to the output of only one of the audio oscillators; that is, one filter 325 passes frequencies of 100 to 190 cycles; a second filter 326 passes only frequencies of 250 to 500 cycles; a third filter 327 passes only frequencies of 700 to 1400 cycles; and a fourth filter 328 passes only frequencies of 1500 to 3000 cycles. The outputs of these filters are connected to control circuits 330-333 such as described in Figure 4 for operating the throttle, rudder, ailerons, and elevators respectively. Each control circuit such as used in Figure 4 is associated with a separate motor circuit as 334-337 respectively, as it will generally be convenient to so design it.

It will thus be seen that a movement of any one of the control elements 310-313 will produce a corresponding movement of the corresponding aircraft control in the remotely controlled aircraft. The system requires only one radio transmitter and receiver, and operates on but a single carrier wave. For aircraft use, it will generally be found preferable to use for the power supply for the aircraft controls, the hydraulic power circuit of the aircraft, rather than using electrical power. Since aircraft which are provided with the so-called "automatic pilots" already have an hydraulic power circuit, it will be a simple matter to provide a fluid motor for operating the aircraft controls and to control the operation of this fluid motor by valves which are adapted to be actuated by the relays 25c and 26c of Figure 4, in the same manner as the motor of Figure 4 is controlled.

Changes, modifications, and alternative arrangements are contemplated within the scope of the invention as defined by the appended claims:

I claim:

1. In a remote control system, a source of variable wave energy, means for converting said wave energy into voltages proportional to a change in frequency and independent of amplitude, means for translating said voltages into mechanical motion, comprising means responsive to said proportional voltages for governing the response thereto to effectuate a motion dependent on variations in said voltages, a device to be controlled, and means responsive to the last named means to control the position of said device.

2. The invention as described in claim 1, in which said means for translating said voltages into mechanical motion comprise power means and a circuit for controlling the operation of said power means.

3. In a control system of the class described, a control source including a variable frequency generating device and means for transmitting the variable frequencies generated; means for reception of said transmission including an electronic frequency measuring circuit for translating said variable frequencies into voltages proportional to the variations in frequency; and means for applying said voltages to effect functional performance corresponding to said control source.

4. A controlled unit for a device to be remotely controlled by the transmission of frequencies varying to correspond with the controlled positions desired, said controlled unit comprising a frequency measuring device responsive to said frequencies for converting the variations of frequency into voltages proportional to said frequency variations, a circuit connected to said frequency measuring device, said circuit being normally balanced when said control is quiescent and adapted to be unbalanced by a change in the frequency received by said device, and means responsive to said unbalanced condition for translating said voltages into mechanical motion and to rebalance said circuit.

5. In an electrical remote control system, a control source of transmission including mechanically movable elements, and means for generating signal energy varying in frequency in response to movements of said elements; means for receiving the signal energy from said source; an electronic frequency measuring device coupled to the output circuit of said receiving means, said device acting to convert the variable frequencies from said receiver into voltages whose amplitude is proportional to said frequencies and independent of the amplitude changes of said frequencies; a circuit connected to the output circuit of said frequency measuring device adapted to be balanced by a steady voltage output thereof and to be unbalanced by a change in the voltage output to an extent in proportion to said change; and means coordinating said varying voltages with the said circuit connected to the output circuit of said frequency measuring device, to effect functional performance in proportion to frequency change in said source of transmission, said functional performance being of an additional device coupled to the last named means as a controlled unit.

6. In an electrical control system for effecting functional mechanical motion of a unit corresponding to a given stimulus, a control source including a movable control element, means for generating wave energy varying in frequency in response to movements of said element, and means for transmitting said energy; means responsive to said wave energy comprising a receiver, a frequency measuring device for converting the varying frequencies generated by said source and received by said receiver into voltages proportional to the frequencies; a circuit connected to the output of said frequency measuring device adapted to be balanced at a predetermined voltage by a steady voltage output thereof and to be unbalanced by a change in the voltage output to an extent in proportion to said change; means for rebalancing said output circuit; and a circuit including mechanical power means operatively coupled to said output circuit to have applied thereto proportional voltages of said output circuit in such a manner as to energize said power means during the time that said first mentioned circuit is unbalanced, said power means being mechanically connected to said rebalancing means to thereby rebalance said first mentioned circuit when said power means has been energized in an amount corresponding to the extent to which said first mentioned circuit was unbalanced by said proportional voltages; and an additional device being coupled to said power means as the controlled unit for performing useful function.

7. In an electrical remote control system, a control source of transmission including mechanically movable control elements, and means for generating signal energy varying in frequency in response to movements of said elements; a receiver for the signal energy from said source; an electronic frequency measuring circuit including in its circuit connections a glow discharge tube coupled to said receiver said frequency measuring circuit producing a definite voltage for a given frequency applied thereto; means for translating the output voltages of said frequency measuring circuit into mechanical motion corresponding to the movements of said control elements; and an additional device for performing useful function responsive to said mechanial motion.

8. In a remote control system of the class described, a control source including a movable control element and means for generating wave energy varying in frequency in response to movements of said element; a controlled mechanism communicatively connected to said control source, said controlled mechanism including a source of energy, mechanical power means adapted to be actuated by said energy, means responsive to the variable frequencies generated by said source for controlling the operation of said power means to correspond to the movements of said control element, and means for applying said energy to said power means in proportion to the amount movement of said controlled mechanism is lagging with respect to the movement of said control element.

9. A system for controlling a remote device, said system comprising in combination, a radio transmitter, means for adjusting the output frequency of said transmitter, a radio receiver capable of receiving the output signals from said transmitter, an electronic frequency measuring circuit coupled to the output of said receiver, said circuit acting to convert the variable frequencies from said receiver to voltages whose amplitude is proportional to said frequencies and independent of the amplitude changes of said frequencies, a balance circuit connected to the output of said frequency measuring circuit and adapted to be balanced at a voltage corresponding to the output of the frequency measuring circuit by a steady output voltage thereof and to be unbalanced by a change in the output voltage to an extent in proportion to said change, and means coordinating said varying voltages within the said circuit connected to the output of said frequency measuring circuit to effet a functional performance in proportion to frequency change in said transmitter.

10. In a system for controlling a remote device, a radio receiver responsive to varying frequencies, an electronic frequency measuring circuit communicatively coupled to said receiver and adapted to translate the varying output frequencies therein to voltages proportional to said output frequency variations, a balancing circuit connected to the output of said frequency measuring circuit and adapted to be balanced by a steady output voltage thereof and to be unbalanced by a change in the voltage output to an extent in proportion to said change, a detector coupled to said last mentioned circuit to determine the extent and direction of unbalanced condition of said circuit, a motor controlled circuit coupled to said detector and including a reversible motor which operates in either of two directions in response to the sense of said detector during the time that said circuit connected to the output of said frequency measuring circuit is unbalanced and to an extent in proportion to the change of frequency transmitted, and means mechanically driven by said motor and arranged to rebalance said balancing circuit simultaneously with the operation of said motor.

EDWARD M. SORENSEN.